March 20, 1934.  C. SUNDSTROM  1,951,886
PROCESS AND APPARATUS FOR THE MANUFACTURE OF HYDRATED CALCIUM CHLORIDE
Filed Jan. 27, 1930
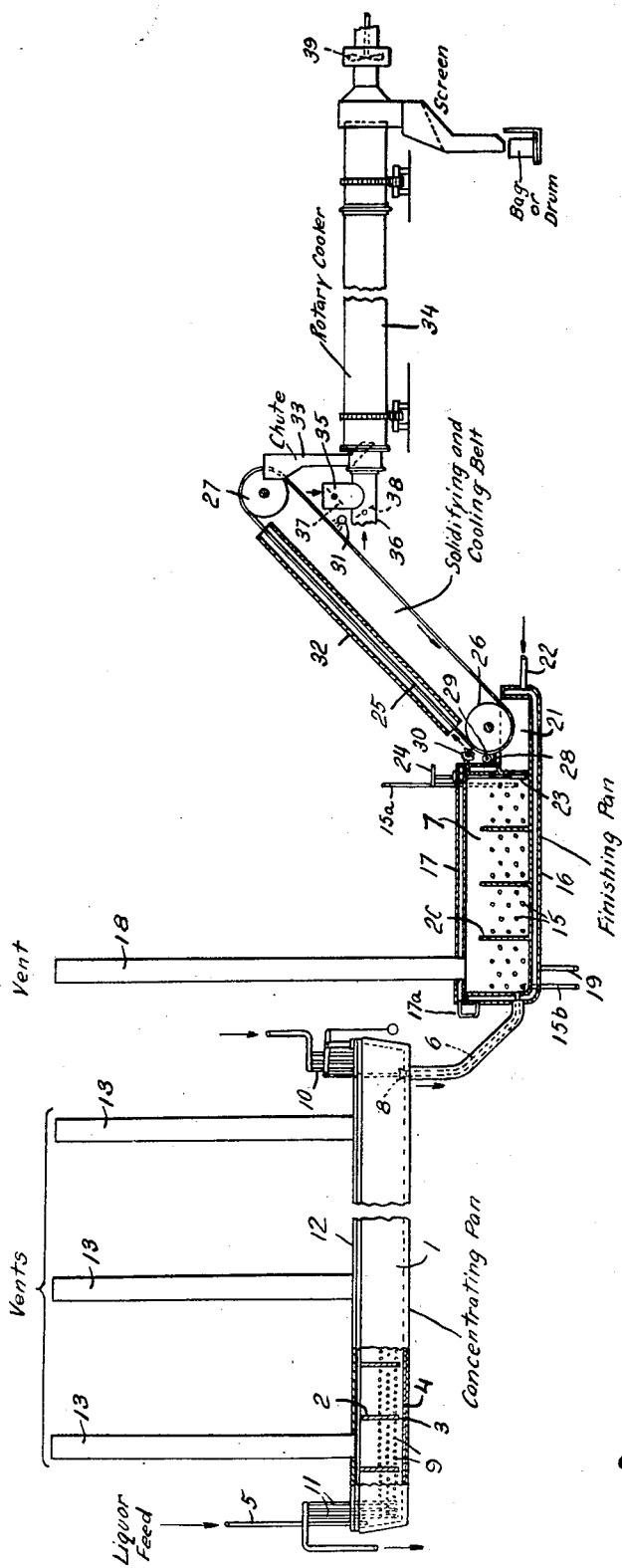
INVENTOR
Carl Sundstrom
BY
ATTORNEY Patented Mar. 20, 1934

1,951,886

UNITED STATES PATENT OFFICE 1,951,886

PROCESS AND APPARATUS FOR THE MANUFACTURE OF HYDRATED CALCIUM CHLORIDE

Carl Sundstrom, Syracuse, N. Y., assignor to The Solvay Process Company, Syracuse, N. Y., a corporation of New York Application January 27, 1930, Serial No. 423,776
In Canada February 10, 1927

7 Claims. (Cl. 23—90)

My invention relates to an improved hydrated calcium chloride product (calcium chloride containing water of crystallization), and process and apparatus for making the improved product.

One of the chief and rapidly increasing uses for hydrated calcium chloride is in connection with road construction and road maintenance. It has been found that hydrated calcium chloride applied to the surface of a freshly set pavement provides practically an ideal means for the so-called "curing" of the concrete. The time for curing is reduced, the final strength and condition of the pavement is improved, and the labor of curing, compared with that of the old earth-covering and sprinkling method, is reduced and simplified. It also has been found that hydrated calcium chloride is one of the best "dust layers" for dirt and gravel roads. It has the peculiar advantage of holding the binding material on the road, as well as keeping the dust down, so that it acts as a surface binder and assists in keeping the road smooth during the dry season.

The calcium chloride seems to act by virtue of its property of absorbing moisture from the air onto its surface and becoming liquid, in whole or in part. To obtain best results, the chloride should have two characteristics, one physical and the other chemical. The physical characteristic is that each particle should have substantial size (as distinguished from fine grains), and be of a flat shape so as to have large superficial area for its mass. The chemical characteristic is that the water of crystallization content of each particle should be such that, together with the additional water absorbed onto its surface from the air, a liquefaction of the calcium chloride will result as promptly as possible. Not merely is it desirable to have the liquefaction proceed rapidly in order to get the desired results promptly, but also until the chloride has bound itself in place by liquefaction, there is constant risk of loss due to the chloride being blown away or disturbed by wind or washed away by heavy rain before it has performed its function.

The first characteristic—physical form—is obtained by flaking the material.

The second characteristic—water of crystallization content—however, presents the difficulty that this water of crystallization (unless carefully controlled as hereinafter described), tends to cause caking of the material while in the package. A free flowing product is necessary so that it can be applied to the roads evenly and by means of an ordinary distributing machine.

It has been proposed to overcome the caking trouble by making a product, the particles of which are superficially heat dried, so that they have an outer layer or coating which is anhydrous or relatively poor in water of crystallization. While this may overcome the caking difficulty, it fails to provide the desired water of crystallization precisely where it is most needed, namely, in the surface and outer portion of the particle. The result is that considerable additional water must be absorbed from the air before liquid can be formed, and the product is accordingly slow in its action.

I have now found that, if the product is practically free from water of crystallization in excess of that corresponding to the dihydrate $CaCl_2.2H_2O$, and is substantiallly uniform throughout, it does not cake under the conditions to which it is ordinarily subjected before use, and that any outer dried or anhydrous coating is then not necessary. I have further discovered a process and apparatus whereby this calcium chloride, practically free from water in excess of the dihydrate, can be produced as solid and in the desired form. The result is a non-caking product in flake form and substantially homogeneous, i. e., a product in which the outer as well as the interior portion of its particles contain substantially the optimum water content ($CaCl_2.2H_2O$), and which is, therefore, best adapted as a "curing" and dust preventing agent for roads.

In pure $CaCl_2.2H_2O$ there are approximately 36 grams of water for every 111 grams of the calcium chloride, i. e., about 75.49% calcium chloride. If water in excess of that amount is present, the next higher hydrate $CaCl_2.4H_2O$ is formed to a corresponding extent. Whenever water in excess of that corresponding to the hydrate $CaCl_2.2H_2O$ is present, caking is apt to occur. This probably occurs because the melting point of $CaCl_2.2H_2O$ is about 176° C. and the melting point of $CaCl_2.4H_2O$ is only about 45° C. so that the latter, wherever present, is apt to melt at summer temperatures (particularly if the usual iron drum container is exposed to the sun when the temperature may rise to as high as 60° C.). Hence, on cooling subsequently, this melted $CaCl_2.4H_2O$ probably solidifies and cements together the $CaCl_2.2H_2O$, causing a caked product. For a non-caking product, the particles should be substantially homogeneous and water in excess of that in $CaCl_2.2H_2O$ should be substantially uniformly eliminated throughout the mass.

For making a product of the type described, a highly concentrated liquor is required. It has hitherto been supposed that the handling on a commercial scale of calcium chloride liquor closely approaching CaCl$_2$.2H$_2$O in composition was impractical, because as the composition of the liquor is made to approach CaCl$_2$.2H$_2$O, the boiling point and solidification point of the material tend to coincide. Hence, if the attempt is made to maintain a liquor approaching CaCl$_2$.2H$_2$O in composition, in liquid condition, precipitation of solid tends to occur due to the further evaporation at the high temperature needed to maintain the liquid condition. Moreover, any slight incidental cooling of the liquor results in the formation of a solid crust. Hence, it is impractical to convey such liquor in pipes, or treat commercial batches by ordinary apparatus and methods because the usual types of handling necessitates conditions under which evaporation or cooling to a prohibitive, even though slight extent, may occur.

The reason for these difficulties may be readily appreciated and understood by comparing the boiling point data of concentrated calcium chloride solutions with the data showing the maximum solubility of calcium chloride in water. If the boiling point curve of calcium chloride at 760 mm. pressure be plotted (with temperatures as ordinates) and then if a second curve be plotted of the solubility of calcium chloride in water with increasing temperature, it will be found that the boiling point curve intersects the solubility curve at a point corresponding to a concentration of calcium chloride of about 69.2%. Thus it will be seen that if a calcium chloride solution is concentrated by evaporation, the solution, when the calcium chloride concentration thereof approaches 69.2%, will begin to deposit solid CaCl$_2$.2H$_2$O. In other words, it is not possible under ordinary conditions to produce a solution of calcium chloride in water in which the concentration of CaCl$_2$ is above 69.2% or approaches the concentration of 75.49% of CaCl$_2$ present in the desired dihydrate product CaCl$_2$.2H$_2$O. Furthermore, the formation and deposition of CaCl$_2$.2H$_2$O in solid form from the solution as it becomes concentrated, gives rise to the very objectionable practical difficulties referred to above of caking and solidification of the liquor. In my process these difficulties are overcome and it is possible to produce a calcium chloride solution of a concentration materially greater than 69.2%, and furthermore, it is possible to bring the liquor to this high concentration without undue interference with the operation by the formation of solid crusts or so much precipitation of solid matter as to interfere with the flaking of the calcium chloride or formation thereof into the desired uniform particle size.

I have ascertained, as the result of extended investigation, the effect of certain factors on the properties of concentrated calcium chloride solutions and have discovered methods of controlling these factors to enable the successful production on a commercial scale of highly concentrated calcium chloride solutions and the subsequent conversion thereof into flake or other desired form. I have found that the point at which the boiling point and solubility curves of calcium chloride solution intersect is raised (i. e., the maximum CaCl$_2$ content is increased) by the presence in the solution of other metal chlorides, particularly sodium chloride, and furthermore, as the concentration of sodium chloride in the solution increases, the boiling point curve of the solution is raised at a proportionately greater rate than the solubility curve and when a certain concentration of sodium chloride hereinafter indicated is reached, the boiling point curve is raised to an extent such that it does not intersect the solubility curve of CaCl$_2$.2H$_2$O. Thus, by maintaining the concentration of sodium chloride above the minimum required amount, it becomes possible to produce solutions of calcium chloride of substantially greater calcium chloride concentration than 69.2% and approaching about 73%. The minimum permissible NaCl concentration may be best expressed in terms of the ratio by weight of calcium chloride to NaCl in the solution, which ratio should be not greater than about 55.

I have also found that if a calcium chloride solution of the composition above specified is concentrated up to a point where the CaCl$_2$ concentration is substantially 73% and preferably is not less than about 72.2%, the solution may then be transferred to a flaking roll or other solidifying device and by merely permitting the material to cool from its initial high temperature in contact with the atmosphere, it will lose by evaporation sufficient water to bring the concentration of calcium chloride up to or above that concentration at which the calcium chloride is substantially wholly in the form of dihydrate, so that a product is obtained in which the calcium chloride is substantially uniformly in the form of dihydrate and thus possesses the desired non-caking properties.

The following is an example of my process:

A calcium chloride liquor of about 40–45% strength is prepared and containing not less than the minimum desired content of NaCl or other metal salt. If made from waste calcium chloride liquor from the ammonia soda process, the impurity content at this stage may be, for example, about .8% sodium chloride (NaCl) and .08% other impurities. This liquor which then has a boiling point of about 125° C. is further concentrated by evaporation until its boiling point has increased to about 170° C.–172° C. The liquor then contains about 70.5–71.5% of calcium chloride, the balance being water with a small percent of impurities.

This concentration is advantageously carried out in the type of apparatus illustrated in the drawing, which shows a diagrammatic view of the apparatus in side elevation with parts shown in cross section.

Referring to this drawing, 1 is a shallow concentrating pan, which is divided into compartments by partitions 2 provided with restricted openings 3 furnishing communication between adjacent compartments. The apparatus is lined with suitable heat insulating material such as brick resistant to the liquor or other suitable material 4. Fresh liquor in regulated amount enters one end of the pan 1 through the feed pipe 5 and concentrated liquor leaves at the other end by a pipe 6 leading to the finishing pan 7, hereinafter described. The pipe 6 is provided with a mechanically controlled valve 8. Suitable dimensions for the pan (inside measurements) are, for example, length 56 feet, width 7 feet, depth 2¾ feet, with, say 10 compartments. Within the pan are a series of steam coils 9 into which live steam is forced by the inlet steam pipes 10, and from which the drips are removed by the outlet steam pipes 11. The pan 1 is further provided with a cover 12 of wood or other suitable material, having vent pipes 13.

The several compartments communicating only by restricted openings produce the effect of a series evaporating apparatus. The steam supplied is regulated so that the temperature of the liquor in the last compartment is approximately 170–172° C., to which it increases by successive steps in each compartment from about 125° C. in the first compartment. By virtue of this stage concentration, and design of apparatus, a relatively low steam pressure may be used, for example, about 160 lbs. gage, and further it is not necessary to maintain a large quantity of the liquor at the final temperature at which it is not so easy to handle because of its tendency to solidify. Even at the final concentration in this device, the temperature of this 70.5–71.5% calcium chloride liquor can still fall several degrees from its boiling point without becoming difficult to handle. It may, therefore, be run off through the outlet pipe 6, which is provided with a steam jacket to the finishing pan 7.

Like the concentrating pan 1, finishing pan 7 is a shallow pan provided with a series of steam coils 15, having inlet and outlet steam connections 15a and 15b, and is further provided with a steam jacket 16 which surrounds the bottom, sides and cover 17. Suitable connections 17a are provided for admitting steam to the cover and removing the drips. The steam pressure in the coils may be in the neighborhood of 160 lbs. gage. The steam in the jacket is preferably adjusted to maintain a temperature about 1° or 2° higher than the highest temperature of the liquid. The cover 17 is provided with a vent pipe 18 to allow for the escape of the water evaporated. A drain 19 is provided in the bottom of the pan 7 for removing the steam drips. Within the pan 7 are a plurality of baffles 20, which restrict the flow of the liquor, and the effect of which is similar to that of partitions 2 of the preceding concentrating pan. Suitable dimensions for the finishing pan (exclusive of the compartment 21) are, for example, length 20 feet, width 4 feet, depth 2 feet (inside dimensions).

At its further end the pan 7 is provided with a compartment, the bottom and sides of which are also covered by the steam jacket, but which is open at the top, so that the solidifying belt, which substantially covers the top surface, as hereinafter described, dips therein. The steam inlet 22 for the jacket is located at the further end of this compartment so that it will be maintained at the maximum temperature. The flow of liquor into the compartment 21 is controlled at the gate operated by the wheel 24. The gate is opened just enough so that the liquor flows into the compartment 21 as rapidly as it is removed therefrom by the solidifying belt, as hereinafter described.

The steam and flow of liquor are so regulated that in the compartment 21, the liquor has been concentrated to a boiling point of about 175–177° C. This corresponds to a calcium chloride content of about 72.2 to 73%. Relatively little concentration takes place in this compartment 21, the main purpose here being to maintain a temperature at which the liquor will be sufficiently fluid to produce the desired thickness of film on the casting belt and to maintain such temperature as uniformly as possible throughout the mass.

During the concentration, the percentage of salt (NaCl), which is the chief impurity, has usually increased to about 1.5%, other impurities being about .15%. This corresponds to a ratio of $CaCl_2$ to NaCl of about 48, and preferably in the operation of my process this ratio is maintained within the range 35–55.

On an impurity free basis the liquor is about 74.2% of calcium chloride to 25.8% of water. This, in a solid state, would correspond to between 8 and 9 parts by weight of the undesired $CaCl_2.4H_2O$ to about 92 parts of $CaCl_2.2H_2O$. By operating in the manner described, it is possible to bring the liquor to this high concentration without interference with the operation by the formation of solid crusts, or so much precipitation as to interfere with the flaking.

In the flaking operation, which by reason of the above-described arrangement, is continuous with the concentrating step, the percentage of water becomes still further reduced and in accordance with my invention is reduced to or below that point at which substantially all of the $CaCl_2$ is in the form of non-caking dihydrate. For this purpose the liquor in the compartment 21 is picked up by an endless belt 25 which travels over a roller 26 positioned within the extension 21 of the finishing pan 7 so that the belt dips into the liquor, and thence around another roller 27 located a suitable distance away and advantageously at a higher elevation. A layer of the liquid adheres to the belt and gradually solidifies as it cools with further automatic loss of water.

The speed and temperature of the belt are regulated to make the adhering layer of suitable thickness, for example, .05–.07 inches. The length of the belt is sufficient to permit the layer of material to harden to a "set" by the time it reaches the roller 27 at the further end so that it readily separates from the belt as the belt turns over the roller 27. The belt may be made of any suitable material, such as a steel ribbon, for example. If the material is marked on the belt while it is still somewhat soft, the layer will break up into pieces substantially corresponding to the markings, as it separates and falls from the belt 25. For this purpose the toothed knife 28 or revolving discs 29 and the revolving ribbed cylinder 30 may be provided. Flat particles of selected size may thus be obtained.

The belt 25 may, if desired, be cooled by making one or both of rollers 26 or 27 hollow cylinders through which a cooling medium is passed, or by spraying the belt 25 with air or water on its return trip, as indicated at 31. If water be used, it should be adjusted to evaporate, or be otherwise removed, before the portion of the belt so cooled returns to the liquor. A casing 32 may also be provided above the belt 25, forming a passage through which air may be passed to cool the material on the belt 25.

A satisfactory temperature for the solidified material on the belt 25 by the time the end roller 27 is reached is, for example, 140° C., but a wide range of temperature is available.

The material falls from the belt 25 through a feed chute 33 to a rotary air cooler 34, through which air is passed co-current with the material under treatment. The air doors 35 and 36, one of which may conveniently be arranged to communicate with indoor air and the other with outdoor air, are provided with adjustable dampers 37 and 38 respectively for the regulation of the air supply and the air may be sucked through the cooler by the fan 39 at its further end. The interior of the cooler may be provided with a series of inclined deflecting flights which serve to agitate and advance the material in the cooler.

In the rotary cooler, the material is further cooled uniformly and advantageously to as low a temperature as the atmospheric conditions will permit. Sufficient cooling can usually be obtained with ordinary atmospheric air. For example, assuming 80% humidity and 30° C. for summer air and 60% humidity and 5° C. for winter air, the temperature to which the material may be cooled for summer is approximately 82° C. and for winter 55° C. The cooling should be carried to a temperature below that at which local disturbances in the water distribution take place on standing—a phenomenon, sometimes termed "sweating". This temperature is generally in the neighborhood of 90° C. when, as is usual, the material is piled in large piles or packed in large containers. Conditioned air may, of course, be used for the belt treatment and cooling treatment if for any reason it is desired to terminate the operation at a particular temperature.

After cooling to a temperature below the sweating point, the material is advantageously screened to remove fines and packed immediately. During the treatment in the cooler some further loss of water automatically and unavoidably takes place.

A typical analysis of the finished product shows about 75.4 parts of $CaCl_2$ to 24.6 parts of water by weight, or, in other words, corresponding to about 99.4% of $CaCl_2.2H_2O$ and about .6% of $CaCl_2.4H_2O$ on an impurity free basis.

The loss of water after the finishing pan, i. e., during the cooling, depends on the conditions during cooling and may be varied to some extent by regulating these conditions. For example, rapid cooling at the outset on the belt 28 tends to increase the water content of the finished product, while gradual cooling with a current of air at ordinary temperatures tends to decrease the water content of the finished product. Hence, under atmospheric conditions which favor loss of water during cooling, it is possible to start with a liquor not quite so highly concentrated or to obtain a product, the particles of which, while still homogeneous, may contain slightly less water than that corresponding to the dihydrate $CaCl_2.2H_2O$. However, if the loss of water during the cooling is too vigorous, there is a tendency for the particles to become dried on the surface principally, thus disturbing the homogeneity of the particles. This is evidenced by the appearance of a substantial dead white coating on the outer surface of the particles when broken.

On the other hand, a more highly concentrated liquor may be used, with less loss of water during cooling, by conducting the finishing pan operations at a pressure above that of the ordinary atmosphere, since pressure tends to separate the boiling and freezing points of the liquor.

While it is preferred, as above stated, to treat the material on the belt and in the cooler under such conditions as to make a homogeneous product, this method and apparatus may, if desired, be adapted for making a superficially coated or dried product, by vigorously drying the material on the belt or in the cooler, without departing from the scope of this invention. For making such a product, the material on the belt may, if desired, be treated with hot air instead of air at an ordinary temperature, as above recommended.

It will be obvious from the foregoing, that many modifications may be made without departing from the spirit and scope of the invention, and that various steps or features of my method and apparatus include specific inventions which may be advantageously employed independently as steps or features of other process and apparatus.

This application is a continuation-in-part of my co-pending application Serial No. 87,774, filed February 12, 1926.

I claim:

1. The process of making a hydrated calcium chloride which comprises concentrating calcium chloride liquor containing other metal salts in quantity such that the ratio by weight of calcium chloride to said other metal salts is not substantially greater than 55, until the concentration of calcium chloride in the liquor is substantially 72.2–73%, converting the concentrated liquor into solid divided form and cooling the solidified material and simultaneously evaporating water therefrom, whereby a non-caking calcium chloride product is produced containing substantially no water in excess of that corresponding to the dihydrate.

2. The process of making a hydrated calcium chloride which comprises concentrating calcium chloride liquor containing sodium chloride in quantity such that the ratio by weight of calcium chloride to sodium chloride is within the range 35–55, until the concentration of calcium chloride in the liquor is substantially 72.2–73%, converting the concentrated liquor into solid divided form and cooling the solidified material and simultaneously evaporating water therefrom, whereby a non-caking calcium chloride product is produced containing substantially no water in excess of that corresponding to the dihydrate.

3. The process of making a hydrated calcium chloride which comprises concentrating a flowing stream of calcium chloride liquor gradually until the boiling point of the liquor is substantially 170°–172° C., transferring the liquor to a compartment closed to the atmosphere while maintaining the temperature of the liquor in said compartment substantially uniformly at about 175°–177° C., then causing a portion of the concentrated liquor from the said closed compartment to assume a solid form having an extended surface area, and then cooling the calcium chloride and simultaneously evaporating water therefrom, whereby a non-caking calcium chloride product is produced in which the calcium chloride is substantially wholly in the form of dihydrate or a lesser hydrate.

4. The process of making a hydrated calcium chloride which comprises concentrating a flowing stream of calcium chloride liquor gradually until the boiling point of the liquor is substantially 170°–172° C., transferring the liquor to a compartment closed to the atmosphere while maintaining the temperature of the liquor in said compartment substantially uniformly at about 175°–177° C., then converting the liquor into solid flakes and causing the flakes to cool in contact with a stream of air under conditions such that the temperature of the flakes is reduced to a temperature below about 90° C.

5. The process of making a hydrated calcium chloride which comprises gradually concentrating a flowing stream of calcium chloride liquor having a content of sodium chloride such that the ratio by weight of calcium chloride to sodium chloride is not substantially greater than 55, until the boiling point of the liquor is substantially 170°–172° C., transferring the liquor to a finishing stage closed to the atmosphere while maintaining the temperature of the liquor in said stage substantially uniformly at about 175°–177° C., then causing a portion of the concentrated liquor from the finishing stage to adhere as a film to a cooling surface, and cooling the calcium chloride and simultaneously evaporating water therefrom, whereby a non-caking calcium chloride product is produced in which the calcium chloride is substantially wholly in the form of dihydrate or a lesser hydrate.

6. The process of making hydrated calcium chloride which comprises preparing a calcium chloride liquor containing other metal salts in quantity such that the ratio by weight of calcium chloride to said other metal salts is not substantially greater than 55, concentrating said liquor, until the concentration of calcium chloride in the liquor substantially reaches the point where further concentration would result in the formation of a solid and converting the concentrated liquor into solid divided form.

7. The process of making hydrated calcium chloride which comprises concentrating a calcium chloride liquor containing other metal salts in quantity such that the ratio by weight of calcium chloride to said other metal salts is not substantially greater than 55, until the concentration of calcium chloride in the liquor substantially reaches the point where further concentration would result in the formation of a solid, converting the concentrated liquor into solid divided form and cooling the solidified material, and simultaneously evaporating water therefrom, whereby a non-caking calcium chloride product is produced containing substantially no water in excess of that corresponding to the dihydrate.

CARL SUNDSTROM.